United States Patent
Nubling et al.

(10) Patent No.: US 9,644,945 B2
(45) Date of Patent: May 9, 2017

(54) METHOD OF MEASURING AN OBJECT

(71) Applicant: SICK AG, Waldkirch/Breisgau (DE)

(72) Inventors: Achim Nubling, Emmendingen (DE);
Thorsten Harter, Ortenberg (DE);
Carsten Ehrler, Freiburg (DE)

(73) Assignee: SICK AG, Waldkirch/Breisgau (DE)

( * ) Notice: Subject to any disclaimer, the term of this patent is extended or adjusted under 35 U.S.C. 154(b) by 57 days.

(21) Appl. No.: 14/793,761

(22) Filed: Jul. 8, 2015

(65) Prior Publication Data

US 2016/0010975 A1     Jan. 14, 2016

(30) Foreign Application Priority Data

Jul. 11, 2014  (EP) .................... 14176706

(51) Int. Cl.
*G01B 11/24* (2006.01)
*G01B 11/04* (2006.01)
*G01S 17/10* (2006.01)
*G01S 7/487* (2006.01)
*G01S 17/87* (2006.01)

(52) U.S. Cl.
CPC .......... *G01B 11/04* (2013.01); *G01S 7/4873* (2013.01); *G01S 17/10* (2013.01); *G01S 17/87* (2013.01)

(58) Field of Classification Search
CPC ......... G01B 11/04; G01S 17/10; G01S 17/87; G01S 7/4873
USPC ................................. 356/601–640
See application file for complete search history.

(56) References Cited

U.S. PATENT DOCUMENTS

2003/0218919 A1  11/2003  Arita et al.
2012/0113410 A1   5/2012  Iwasawa et al.

FOREIGN PATENT DOCUMENTS

DE  10 2012 021 831 A1  5/2014
EP   2 455 780 A1       5/2012

OTHER PUBLICATIONS

Jihyu Yoon et al: "LADAR based obstacle detection in an urban environment and its application in the DARPA Urban challenge", Control, Automation and Systems, 2008. ICCAS 2008. International Conference on, IEEE, Piscataway, NJ, USA, Oct. 14, 2008, pp. 581-585, XP031367956, ISBN: 978-89-950038-9-3.

*Primary Examiner* — Tri T Ton
(74) *Attorney, Agent, or Firm* — Nath, Goldberg & Meyer; Jerald L. Meyer

(57) ABSTRACT

A method of measuring an object by means of at least one first laser scanner is described which detects measured values for a plurality of measurement points, wherein only measured values which lie above a predefined threshold value are used for measuring the object. The method is characterized in that threshold values are determined separately for at least two ranges of measurement points of the laser scanner or laser scanners and the threshold value used for a measurement point is selected in dependence on a quality criterion.

15 Claims, 2 Drawing Sheets

METHOD OF MEASURING AN OBJECT

Figure 1:
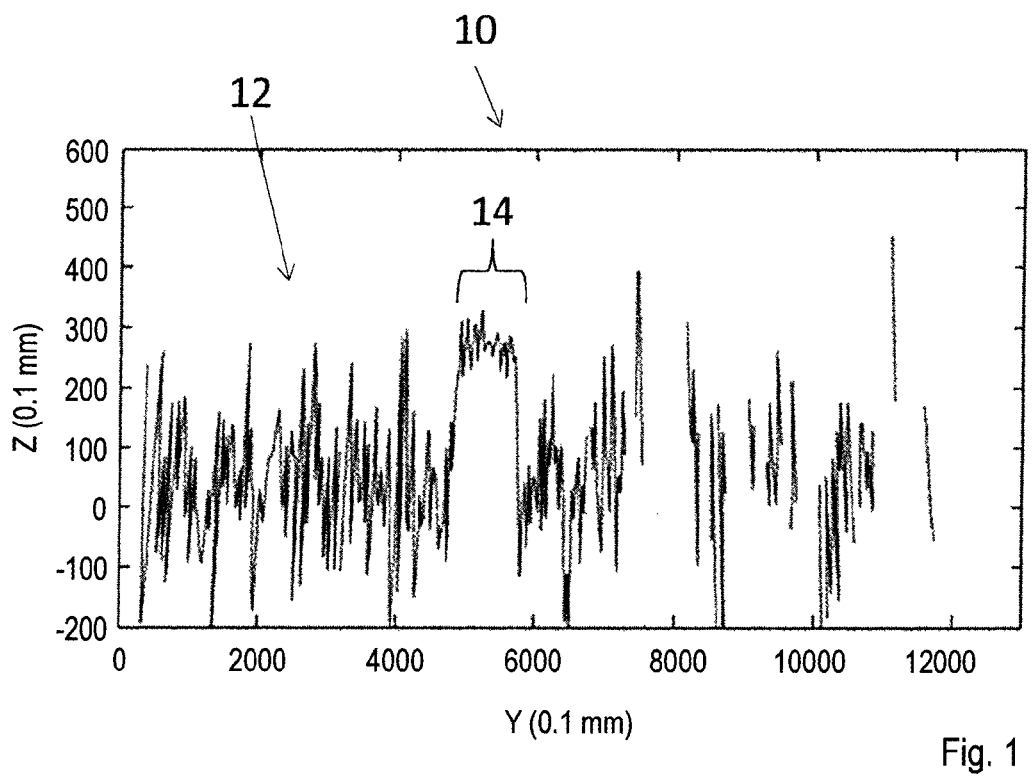

The present invention relates to a method of measuring an object by means of at least one first laser scanner which detects measured values for a plurality of measurement points, wherein only measured values which lie above a predefined threshold value are used for measuring the object.

Laser scanners are used in a plurality of applications for measuring objects, for example to determine the presence, the location, the width and/or the height or the distance of an object. Laser scanners are preferably used in this respect in automation technology in order, for example, to measure objects transported on conveyor belts or tray sorters. The height of parcels and letters is in particular determined by means of laser scanners in parcel sorting machines or letter sorting machines, for example.

Edge hit filters or median filters are typically used, for example, to filter the measured values detected by the laser scanner. The measured values filtered in this manner are subsequently further processed using a simple threshold value process. A threshold value is provided for this purpose due to the statistical noise of the measured values of the laser scanner, wherein only measured values which lie above the threshold value are used for measuring the object.

The measured values of a laser scanner are disadvantageously always subject to a certain amount of noise (see FIG. 1) so that the threshold value dependent on the noise has to be selected as relatively high, which in particular makes the measurement of flat objects more difficult. Flat objects can then not be measured reliably and thus with calibration relevance.

It is thus the underlying object of the invention to provide a method of measuring an object by means of a laser scanner, the method also allowing a reliable and stable measurement of flat objects.

This object is satisfied in accordance with the invention by the method in accordance with claim 1 and in particular in that threshold values are determined separately for at least two ranges of measurement points of the laser scanner.

In this respect, the invention makes use of the recognition that the threshold value to be used does not have to be the same for every measurement point. A respective threshold value is accordingly determined for at least two ranges of measurement points of the laser scanner, wherein the selection of the threshold value can take place in dependence on a quality criterion. A quality criterion is generally a parameter influencing the measurement accuracy of the laser scanner. The quality criterion thus indirectly describes the measurement accuracy of the laser scanner and thus the height of the threshold value to be used.

Due to the use of at least two ranges of measurement points and thus due to the use of at least two threshold values, at least one of the threshold values can be lower than a conventional threshold value determined for the total measurement range of the laser scanner. Lower and thus flatter objects can then also be measured due to the at least regionally lower threshold value.

As a rule, the laser scanner comprises a light transmitter for transmitting light signals, a light deflection unit (formed, for example, by a rotating mirror) for the periodic deflection into a detection zone of the light signals transmitted by the light transmitter and comprises a light receiver for receiving light reflected back by an object located in the detection zone. A linear (one-dimensional) or rectangular (two-dimensional) zone in which the measurement points are located can be scanned by means of the light signal by means of the laser scanner. At least one measured value is typically detected for each measurement point. The measured value is subsequently compared with the threshold value valid for the range of the measured point with which the measured value is associated. If the measured value is larger than the respective threshold value, the measured value is used for measuring the object.

A linear zone can also be scanned by means of the light signal, wherein the object to be measured is moved, e.g. from a conveyor belt, as a rule perpendicular to the linear zone to measure the object as a whole.

The measured values of the laser scanner in particular indicate a distance from the laser scanner. The distance is calculated by the laser scanner for this purpose e.g. by means of a transmit time measurement of the light signal at the respective measurement point or at a phase shift of a modulated signal caused by the transit time. The association of the measured distance with a measurement point in this respect takes place by means of the angle at which the laser scanner transmitted the respective light signal. The height of the object can then, for example, be determined using the known distance, e.g. of the conveyor belt, i.e. of the background of the object. The measured values can accordingly also be vertical measured values.

Advantageous embodiments of the invention are described in the description, in the drawings and in the dependent claims.

In accordance with an advantageous embodiment, the threshold value is determined separately for each measurement point of the laser scanner. This means that the lowest possible threshold value can be used for each measurement point. Alternatively, a respective common threshold value can also be determined for groups of e.g. a respective two, three, four, ten or a hundred measurement points.

The threshold value is particularly preferably calculated on the basis of the statistical noise of the measured value of a measurement point. The threshold value of a single measurement point can then, for example, be fixed at twice the standard deviation ($2\sigma$) or at three times the standard deviation ($3\sigma$) of the statistical noise. If a threshold value is determined for a plurality of measurement points or for a range of measurement points, the average or the median of the statistical noise of the respective measured values can be used as the basis, for example.

Alternatively or additionally, the threshold value is calculated on the basis of the angle of incidence of a light signal. The angle of incidence of the light signal influences the measurement accuracy of the laser scanner to the extent that particularly exact measured values are possible if the light signal is incident perpendicular on a surface to be measured. The threshold value can thus be calculated on the basis of the angle of incidence, with the angle of incidence simultaneously also representing a quality criterion. Consequently, in dependence on the angle of incidence, the threshold used can generally be selected independently of how the threshold value was determined.

Alternatively or additionally, the threshold value is likewise calculated on the basis of a measured distance. The underlying recognition in this respect is that the measurement accuracy of the laser scanner reduces when the laser scanner measures larger distance values. The measured value of the distance can in this respect simultaneously also be used as a quality criterion, that is the threshold value to be used can be selected accordingly on the basis of the distance, for example from the object, measured by the laser scanner.

Further alternatively or additionally, the threshold value is calculated on the basis of a known property of a background of the object. The background of the object can, for example, be a conveyor belt which has a known color or a known joint spacing between individual conveyor plates. The spacing of the joints of the conveyor plates can be measured by means of the laser scanner, for example. For the event that the measured joint spacing coincides very precisely with the known joint spacing, it can be assumed that the measurement accuracy of the laser scanner is high. A low threshold can accordingly then be fixed. In the converse case, the threshold value is increased on an imprecise measurement, i.e. when the measured joint spacing and the known joint spacing differ widely from one another. In this respect, the measured known property of the background of the object can in turn simultaneously also serve as a quality criterion, that is the threshold value is both determined and selected on the basis of the property.

The threshold value can generally be calculated on the basis of a parameter, e.g. of the statistical noise, and can be selected on the basis of a quality criterion which is based on another parameter, e.g. on the angle of incidence or on the remission.

The threshold value for each measurement point of the laser scanner is preferably stored in a look-up table. Due to the storage, the respective threshold value only has to be determined and selected once and can be taken from the look-up table in the operation of the laser scanner. In this manner, the process and thus the speed of the operation of the laser scanner can be increased.

In accordance with a further advantageous embodiment, the threshold values are determined and/or selected by means of an FPGA (field programmable gate array) or by means of a GPU (graphics processing unit). In particular FPGAs are particularly suitable for specific recurring tasks and thus allow a fast and inexpensive carrying out of the process.

In accordance with a further advantageous embodiment, the process is repeated for every measurement point of the laser scanner. The respective valid threshold can thus be fixed for every measurement point of the laser scanner.

At least one second laser scanner is particularly preferably used, wherein the measurement ranges of the laser scanner and of the second laser scanner overlap and the respective lower or lowest one of the determined threshold values is selected from the overlap region. In this manner, the laser scanner which is the most accurate for this measurement point and thus the lowest threshold value is used for every individual measurement point, whereby the accuracy of the measurement of the object can be further increased.

Three or more laser scanners having overlapping measurement points can in particular also be used, wherein the laser scanners can in particular be arranged such that zones having a lower measurement accuracy and thus having a high threshold value of the one laser scanner and zones of another laser scanner, with a high measurement accuracy there, overlap.

The threshold value can preferably be determined for the or for each laser scanner by means of a function from which a threshold value progression results. The function can in particular be determined on the basis of a parabolic equation ($y=ax^2+bx+c$). For this purpose, the curvature can be determined from the respective statistical noise of the respective laser scanner for different measurement points. The determination of the low point can take place on the basis of the position of the laser scanner. The minimal value can e.g. be fixed to three times the minimal standard deviation of the measured values of the laser scanner ($3\sigma_{min}$).

In accordance with an advantageous embodiment, that laser scanner is used for the detection of measured values for a respective measurement point in an arrangement having a plurality of laser scanners with which the lowest of the determined threshold values is associated for this measurement point. With a plurality of laser scanners present, that respective laser scanner is therefore used for determining measured values for a measurement point which usually delivers the most exact measured values.

The invention furthermore relates to a laser scanner for measuring an object in a detection zone, having a light transmitter for transmitting light signals, having a light deflection unit for deflecting the light signals transmitted by the light transmitter into the detection zone, having a light receiver for receiving light reflected back by the object located in the detection zone, wherein the laser scanner is configured to detect measured values for a plurality of measurement points and only to use measured values for measuring the object which lie above a predefined threshold value, and wherein the laser scanner comprises an evaluation unit which is configured to determine threshold values separately for at least two ranges of measurement points and to select the threshold value used for a measurement point in dependence on a quality criterion.

The invention furthermore comprises an arrangement of at least two laser scanners of the previously described kind having detection zones overlapping at least regionally. The arrangement is characterized in that the evaluation units are configured to select the respective lower or lowest threshold value for measurement points from the overlap region. As already explained, the advantages of a plurality of laser scanner can in this way be used for an improved measurement of objects, in particular of flat objects.

The evaluation units are preferably configured to use that laser scanner for detecting measured values for a respective measurement point with which the lower one of the determined threshold values is associated.

The statements made with respect to the method apply accordingly to the laser scanner in accordance with the invention and to the arrangement of at least two laser scanners.

Figure 2:
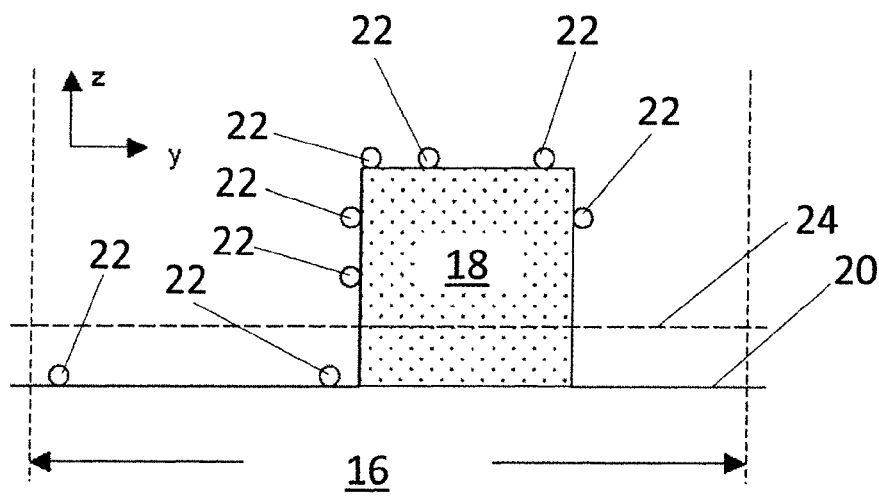
Figure 3:
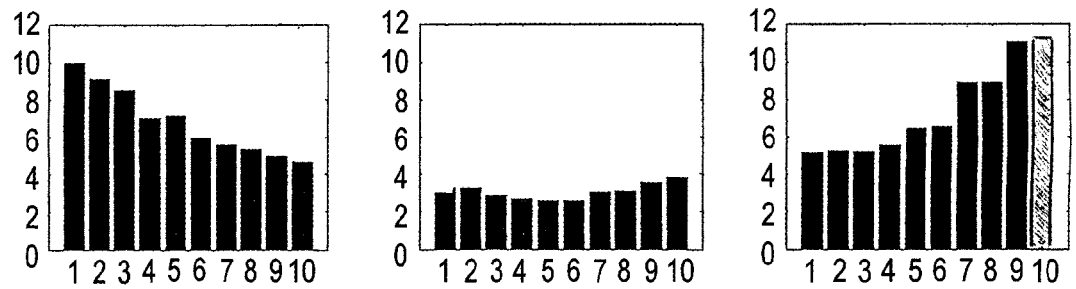
Figure 4:
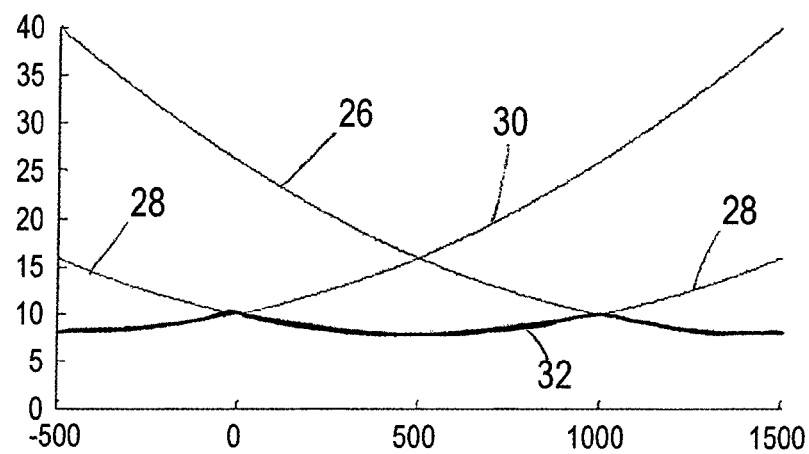

The invention will be described in the following purely by way of example with reference to a possible embodiment and to the enclosed drawings. There are shown:

FIG. 1 a measured signal of a laser scanner of the prior art;

FIG. 2 an object with measurement points for measuring the object;

FIG. 3 the statistical noise of the measured values of three laser scanners in positions differing with respect to the measurement region; and FIG. 4 threshold values of such three laser scanners and the respective selected threshold values.

FIG. 1 shows a measurement 10 using vertical measured values 12 of a measurement of a laser scanner (not shown) entered in the direction of the ordinate. The vertical measured values 12 extend over an elongate range of 1200 mm which is entered on the abscissa. The vertical measured values 12 are calculated from distance measured values taken by the laser scanner from the laser pulse transit time, wherein the distance of the laser scanner from a background of an object is known. The background is e.g. a conveyor belt 20 (FIG. 2).

Vertical measured values 14 of an object 18 (FIG. 2) are present in the abscissa range between approximately 400 and 600 mm. The remaining vertical measured values 12 do not emanate from the object 18, but rather from the conveyor belt 20 and should show the measured value zero in the ideal case. The real vertical measured values 12 shown, however, have statistical noise which produces more inexact vertical measured values 12.

FIG. 2 shows a detection zone 16 of a laser scanner in which an object 18, for example a mail parcel, is located on a conveyor belt 20, wherein the conveyor belt 20 forms the background for the object 18. A plurality of measurement points 22 with which the object 18 is measured are shown in FIG. 2. A conventional threshold value 24 is furthermore drawn which is the same for the total detection zone and thus corresponds to the prior art. Those two measurement points 22 are not taken into account for the measurement of the object 18 which lie below the conventional threshold value 24.

The statistical noise of a laser scanner is, for example, used for a determination of the threshold value in accordance with the invention. Three diagrams are shown as an embodiment in FIG. 3 which represent the statistical noise of a first laser scanner (left), of a second laser scanner (middle) and of a third laser scanner (right) for a respective ten zones. Each of the ten zones can be formed, for example, by 100 measurement points 22. The first, second and third laser scanners are each arranged above the conveyor belt 20, wherein the first laser scanner is attached above the right hand edge of the conveyor belt 20, the second laser scanner is attached centrally above the conveyor belt 20 and the third laser scanner is attached above the left edge of the conveyor belt 20.

The light signals of the second laser scanner accordingly in particular impact the conveyor belt 20 or the object 18 perpendicular at the center of the conveyor belt 20 so that the statistical noise is the lowest here. On the other hand, for example, the statistical noise for the first laser scanner is the lowest at the right edge of the conveyor belt 20 since here the light signals of the first laser scanner impact the conveyor belt 20 or the object 18 almost perpendicular. The light signals of the first laser scanner, in contrast, impact at the left edge of the conveyor belt 20 in a relatively "flat" manner, whereby the statistical noise of the first laser scanner is the highest in this zone. These statements likewise apply in an analog manner to the third laser scanner.

Threshold value progressions which are shown in FIG. 4 can be determined for the laser scanner from the statistical noise shown in FIG. 3. The threshold value progressions have a parabolic shape and are shown in a diagram in FIG. 4. The threshold value progression of the first laser scanner is marked by the reference numeral 26, that of the second laser scanner by the reference numeral 28 and the threshold value progression of the third laser scanner is marked by the reference numeral 30.

The respective lowest threshold value of the threshold value progressions 26, 28, 30 is selected from the thus three respective possible threshold values for each measurement point 22 whereby the curve of the adaptive threshold values marked by 32 results.

In the operation of the three laser scanners, that threshold value of the adaptive threshold values 32 is used for each measurement point 32 which is associated with the position of the measurement point 22. A threshold value can be used in this manner which is lower in comparison with the conventional threshold value 24, whereby flatter objects 18 can also be measured by means of the laser scanners.

REFERENCE NUMERAL LIST 10 measurement
12 vertical measured value signal
14 vertical measured values in the region of an object
16 detection zone
18 object
20 conveyor belt
22 measurement point
24 conventional threshold value
26 threshold value progression of the first laser scanner
28 threshold value progression of the second laser scanner
30 threshold value progression of the third laser scanner
32 adaptive threshold values

The invention claimed is:

1. A method of measuring an object by means of at least one first laser scanner which detects measured values for a plurality of measurement points, wherein only measured values which lie above a predefined threshold value are used for measuring the object,
   the method comprising the step of determining threshold values separately for at least two ranges of measurement points of the at least one first laser scanner.

2. The method in accordance with claim 1,
   wherein the threshold value is determined separately for each measurement point of the at least one first laser scanner.

3. The method in accordance with claim 1,
   wherein the threshold value is calculated on the basis of the statistical noise of the measured value of a measurement point.

4. The method in accordance with claim 1,
   wherein the threshold value is calculated on the basis of the angle of incidence of a light signal at the object.

5. The method in accordance with claim 1,
   wherein the threshold value is calculated on the basis of a measured distance.

6. The method in accordance with claim 1,
   wherein the threshold value is calculated on the basis of a known property of a background of the object.

7. The method in accordance with claim 1,
   wherein the threshold value is stored in a look-up table for each measurement point of the at least one first laser scanner.

8. The method in accordance with claim 1,
   wherein the threshold values are determined and selected by means of an FPGA (field programmable gate array) or of a GPU (graphics processing unit).

9. The method in accordance with claim 1,
   wherein the method is repeated for each measurement point of the at least one first laser scanner.

10. The method in accordance with claim 1,
    wherein at least one second laser scanner is used, with the detection zones of the at least one first laser scanner and of the at least one second laser scanner overlapping at least regionally and the respective lower one of the determined threshold values being selected for measurement points from the overlap zone.

11. The method in accordance with claim 10,
    wherein that at least one first laser scanner or that at least one second laser scanner is used for detecting measured values for a respective measurement point with which the lower one of the determined threshold values is associated.

12. A laser scanner for measuring an object in a detection zone, having a light transmitter for transmitting light signals, having a light deflection unit for deflecting into the detection zone the light signals transmitted by the light transmitter, having a light receiver for receiving light reflected back by the object located in the detection zone, wherein the laser scanner is configured to detect measured values for a plurality of measurement points and only to use measured values for measuring the object which lie above a predefined threshold value, and wherein the laser scanner comprises an evaluation unit which is configured to determine threshold values separately for at least two ranges of measurement points and to select the threshold value used for a measurement point in dependence on a quality criterion.

13. An arrangement of at least two laser scanners in accordance with claim 12, having at least regionally overlapping detection zones,
   wherein the evaluation units are configured to select the respective lower one of the determined threshold values for measurement points from the overlap zone.

14. The arrangement in accordance with claim 13,
   wherein the evaluation units are configured to use that laser scanner for detecting measured values for a respective measurement point with which the lower one of the determined threshold values is associated.

15. The arrangement in accordance with claim 13,
   wherein the evaluation units of the at least two laser scanners are formed by a common evaluation unit.

\* \* \* \* \*